Figure 1:
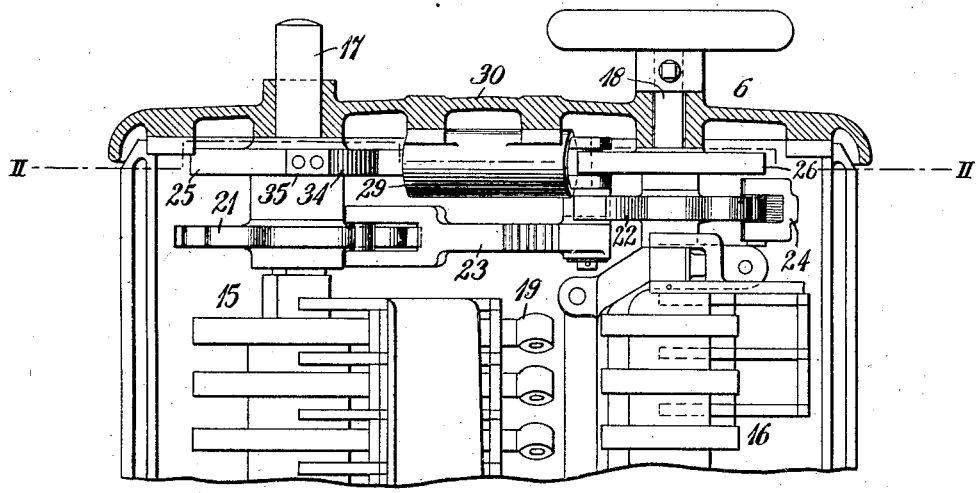

P. S. TURNER.
CONTROLLER.
APPLICATION FILED JAN. 15, 1913.

1,065,009.

Patented June 17, 1913.

2 SHEETS—SHEET 1.

WITNESSES:
Fred H Miller
W. R. Coley

INVENTOR
Percy S. Turner
BY
ATTORNEY

P. S. TURNER.
CONTROLLER.
APPLICATION FILED JAN. 15, 1913.
1,065,009.
Patented June 17, 1913.
2 SHEETS—SHEET 2.
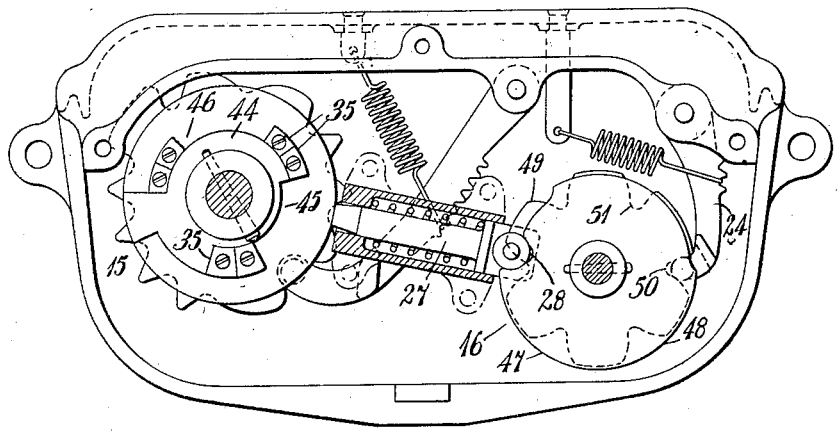
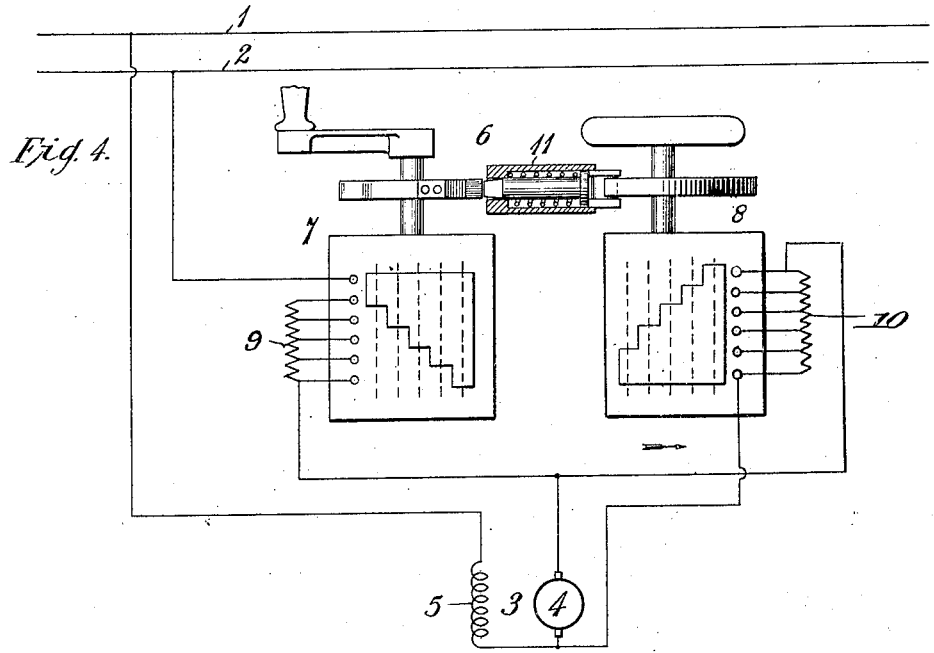
WITNESSES:
Fred H Miller
W. R. Coley
INVENTOR
Percy S. Turner
BY
Asley G Carr
ATTORNEY

UNITED STATES PATENT OFFICE.

PERCY STUART TURNER, OF CHORLTON-CUM-HARDY, ENGLAND, ASSIGNOR TO WESTINGHOUSE ELECTRIC AND MANUFACTURING COMPANY, A CORPORATION OF PENNSYLVANIA.

CONTROLLER.

1,065,009.      Specification of Letters Patent.      Patented June 17, 1913.

Application filed January 15, 1913. Serial No. 742,214.

*To all whom it may concern:*

Be it known that I, PERCY STUART TURNER, a subject of the King of Great Britain, and a resident of Chorlton-cum-Hardy, in the county of Lancaster, England, have invented a new and useful Improvement in Controllers, of which the following is a specification.

My invention relates to control systems for direct current electric motors and more particularly for motors which are operated at very slow speeds, even with light loads, and with fine gradations in speed over a wide range of load.

One way of accomplishing the above result is to employ a large series resistance having a number of taps but, with the usual drum type of controller, it is difficult to obtain a sufficient number of taps to give the required adjustment. Also, the high resistance cuts down the field current as well as the armature current so that the motor does not operate under the best conditions. Again, with a large series resistance, changes in load cause large differences in the speed of the motor. In order to overcome these difficulties, it has already been proposed to make use of a resistance in a shunt circuit to the motor armature, in addition to the resistance in series with the motor. Controllers for governing the speed of motors in accordance with this form of control are well known but, with such controllers, the resistance in shunt to the armature cannot be varied independently of the resistance in series with the motor. Hence, even with a large number of taps on the resistance and a corresponding number of controller positions, the changes in speed of the motor which can be obtained are not always sufficient and the gradations in speed are not fine enough, particularly when widely varying loads have to be handled.

The object of the present invention is to provide an improved controller by means of which the shunt circuit around the motor armature may be made and broken and the amount of resistance therein varied independently of the amount of resistance in series with the motor.

An important feature of the invention consists in the construction and arrangement of the controller, whereby the shunt circuit around the armature cannot be completed if less than a predetermined amount of resistance is connected in series with the motor when the latter is receiving current from the line. In addition, when the motor is connected in a local circuit to act as a generator for braking purposes, the controller is so arranged that only a shunt circuit of comparatively high resistance can be completed around the armature.

According to my invention, I employ a controller which comprises a plurality of switching devices capable of being operated independently, one for making and breaking the shunt circuit around the armature of the motor and varying the resistance therein, and the other for varying the resistance connected in series with the motor, and mechanical means for interconnecting and interlocking these switching devices the one with the other, whereby the switching device for governing the shunt circuit resistance can be operated only when the other switching device is either in its "off" position or in such a position that not less than a predetermined amount of resistance is connected in series with the motor. In some cases, where the motor is used for braking or lowering purposes, the interconnecting or interlocking mechanism between the two switching devices is so arranged that when the switching device controlling the resistance in series with the motor is in certain of the braking positions, the other switching device can be operated only to vary the resistance in the shunt circuit around the armature within predetermined limits.

Another feature of my invention consists in providing a mechanism for preventing the switching device which governs the shunt circuit around the motor armature from being operated to break this circuit except when the maximum amount of resistance is included in said shunt circuit.

A controller of the above indicated class is particularly adapted for crane operating and, although not limited in this respect, in order that the nature of the invention may be clearly understood, a controller for a direct current series crane motor will be described for illustrative purposes.

Figure 2:
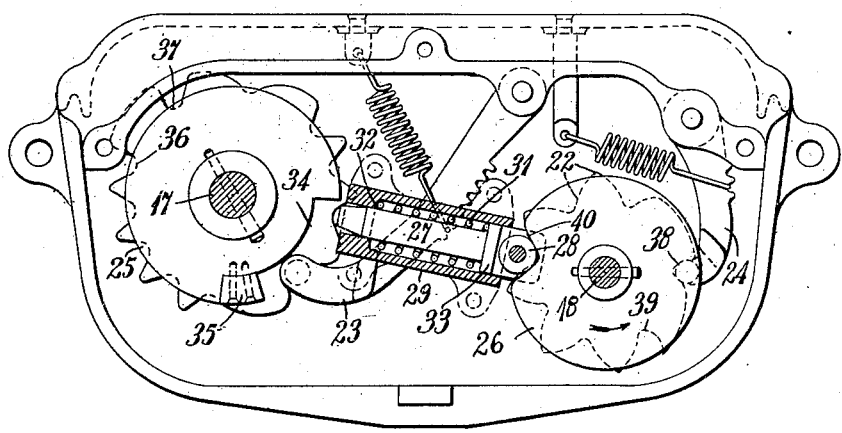

In the accompanying drawings, Figure 1 is a partially sectional elevation of the upper part of a controller constructed in accordance with my invention; Fig. 2 is a sectional view on the line II—II of Fig. 1, Fig. 3 is a view similar to Fig. 2 of a modified form of my invention, and Fig. 4 is a schematic diagram, of the electrical connections employed in the preferred form of my invention.

Reference may now be had to Fig. 4 of the accompanying drawing, in which a supply circuit 1, 2 is adapted to deliver electrical energy to a motor 3, having an armature 4 and a field magnet winding 5 through a controller 6, which embodies a plurality of switching devices or controller drums 7 and 8. The switching devices 7 and 8 are respectively adapted to adjust the circuit connections of a section of resistor 9, which is normally included in series with the motor armature 4 and a section of resistor 10, which may be connected in multiple relation to the motor armature 4. The operation of the switching devices 7 and 8 is restricted and limited to a prescribed sequence by means of an interlocking mechanism 11, which is interposed between the several switching devices and coöperates therewith.

Referring now to Figs. 1 and 2, the controller 6 comprises a plurality of drums 15 and 16 which are respectively mounted on separate shafts 17 and 18, in accordance with the usual practice. The drum 15 hereinafter referred to as the "main" drum, together with its coöperating stationary contact fingers 19, constitutes the switching device 7 in series with the motor 3, while the other drum 16, which will be termed the "shunt" drum, forms, with its stationary contact fingers (not shown), the switching device 8. The drums 15 and 16 are severally provided with notched plates 21 and 22, and spring-actuated pivoted arms 23 and 24 are provided to coöperate therewith for determining the various operative positions, governing the direction of rotation and limiting the travel of the drums. In addition, the drums are respectively provided with cams 25 and 26 which, together with a coöperating spring-actuated bolt or rod 27 located between the drums, constitute the interlocking mechanism 11. The interlocking bolt 27 is provided, at its free end, with a roller 28 and is inclosed in a casing 29 secured to a top plate 30 of the controller. A spring 31 is located between a shoulder 32 in the casing 29 and a collar 33 on the bolt 27, so that the roller 28 is at all times caused to engage the cam 26 on the shunt drum 16. The free end of the bolt 27 coöperates with the cam 25 on the main drum 15, the said cam being provided with a segmental recess 34, the circumferential length of which can be varied by the insertion or withdrawal of one or more removable pieces 35. As shown, the segmental recess 34 extends over an arc corresponding to the arc traversed by the drum 15 when moved from the "off" position to its first two operative positions for hoisting the load. The notched plate 25 on the drum 15 has its last notches 36 and 37 formed to prevent rotation of the drum in either direction from the "off" position beyond the last operative hoisting or lowering position, while the notched plate 26 on the drum 16 has its first notch 38 and its second notch 39 so shaped that rotational movement of this drum from the "off" position or from the first operative position, except in one direction, is prevented.

Assuming the devices and circuit connections to be as shown in Figs. 1, 2 and 4, the operation of the mechanism is as follows: So long as the shunt drum 16 is in its "off" position, the roller 28 on the interlocking bolt 27 enters a notch 40 in the cam 26 and the bolt 27 takes the position which permits the main drum 15 to be moved in either direction from the "off" position to any of its operative positions, since the end of the bolt 27 does not engage the cam 25. If the main drum 15 is in either its "off" position or in the first or the second operative position on the hoisting side, the recess 34 in the cam 25 is opposite the end of bolt 27, thereby permitting the bolt to be moved longitudinally against the spring 31 and the shunt drum 16 to be moved to any of its operative positions, notwithstanding the engagement of the roller 28 with the periphery of the cam 26. If the shunt drum 16 is moved in the direction of the arrow, shown in each of Figs. 2 and 4, from the "off" position to its first operative position the interlocking bolt 27 will be moved longitudinally by reason of the roller 28 being forced out of the notch in the cam plate 26. This movement of the interlocking bolt 27 can only take place while the main drum 15 is in its first or in its second position, as hereinbefore mentioned. So long as the shunt drum 16 remains in any one of its operative hoisting positions, the main drum 15 can not be moved beyond the second operating position in the direction of the arrow shown in Fig. 2, nor beyond the "off" position in the other, or lowering direction, owing to the end of the interlocking bolt 27 being in the segmental recess 34. It will be understood that, as soon as the shunt drum 16 reaches the "off" position, the roller 28 on the bolt 27 will be moved into the recess 40 in the cam 26 and will be withdrawn from the segmental recess 34, whereupon the main drum 15 can be moved to any one of its operative positions in either direction. However, as soon as the main drum 15 occupies any one of its positions other than the "off" or the first two positions on the hoisting side, the shunt drum 16 will be locked against movement because of engagement of the bolt 27 with the cam 25.

It will, of course, be understood that in the first operative position of the main drum 15, the maximum amount of the resistance 9 is in series with the motor 3, while, in the second operative position, although a certain amount of this resistor is cut out, the value of the series resistance is still considerable. In the first position of the shunt drum 16, the shunt circuit around the armature 4 is completed with only a small amount of the resistance 10 included therein, the value of the resistance being increased step-by-step as the shunt drum 16 is moved until, in the last position, the maximum amount of resistance is in circuit. Further movement of the shunt drum 16 in the same direction to the "off" position serves to break the shunt circuit.

As explained above, the shunt drum 16 cannot be moved from its "off" position in a direction which would result in the shunt circuit around the armature 4 being completed with the maximum amount of the resistance 16 therein. Neither can the shunt drum 16 be moved from its first operative position to the "off" position, except by passing through the last operative position, so that the interruption of the shunt circuit around the armature 4 is prevented, until the current therein has been reduced by the insertion of the maximum amount of resistance 10.

To obtain the desired variations in speed of the motor 3, the controller 6 is operated as follows: The shunt drum 16 is moved to its operative position in which a shunt circuit of low resistance is completed around the armature 4 of the motor 3 and the series drum 15 is then moved to its first hoisting position. To increase the speed of the motor 3 by small steps, the shunt drum 16 may then be moved to one or another of its operative positions in which more resistance is included in the shunt circuit around the motor. By moving the shunt drum 16 from its last operative position to the "off" position, the shunt circuit on the armature 4 of the motor is broken and the motor then attains the maximum speed possible on the first notch of the main drum 15 of the controller. The speed of the motor may then be further gradually increased, if necessary, by moving the main drum 15 to one or another of its remaining operative positions in the usual way.

It will be understood that the desired speed of the motor may, in some cases, be obtained by manipulation of the shunt drum 16 alone, while the main drum 15 is in its first position. On the other hand, should the motor 3 fail to start with the main drum 15 in the first position and after the shunt drum 16 has been rotated through all its positions to the "off" position in which the shunt around the motor armature is broken, the shunt drum 16 should again be moved to its first operative position and the main drum 15 then be rotated to its second position in which a portion of the resistance 9 in series with the motor 3 is cut out. Further manipulation of the shunt and main drums is then effected, as may be found necessary, in the manner already described.

The interlocking mechanism 11, so far described, only permits of a shunt circuit of varying resistance being established around the armature 4 in certain of the operative positions of the main drum 15 on its hoisting side. It may be, however, desirable in some cases to so arrange the interlocking mechanism that a shunt circuit of varying resistance may be completed around the armature in certain of the lowering positions of the main drum 15 in which, as is usual, the armature 4 and field 3 of the motor are short circuited through a variable resistance. To accomplish this result, the modified form of controller shown in Fig. 3 may be employed.

Referring to Fig. 3, a cam 44 of the main drum 15 has a segmental recess 45 in a similar position to the recess 34 in Fig. 2, but somewhat increased in depth, while an additional segmental recess 46 of less radial depth is provided corresponding with certain of the operative positions on the lowering side of the main controller drum 15. The circumferential extent of both of these recesses is preferably capable of variation in the manner hereinbefore described, by means of removable pieces 35. A portion 47 of the cam 48 covering the part of its circumference corresponding with those positions of the shunt drum in which the greater part of the resistance 10 in the shunt circuit is cut out, is greater in radius than the remainder of the cam. The notched plate 49 on the shunt drum 16 is provided with a notch 50 so designed that the spring arm 24 will prevent the drum being moved from its "off" position in a counter-clockwise direction, which would include the minimum amount of resistance 10 in the shunt circuit around the armature 4. The plate 49 is also provided with a notch 51 arranged to prevent the shunt drum 16 from being moved from its last operative position, in which the minimum amount of resistance is included in the shunt circuit, to the "off" position in which said circuit is broken. In order to break the shunt circuit, the drum 16 must be rotated in the reverse direction to the "off" position so that, before the circuit is broken, the maximum amount of resistance is inserted into the shunt circuit around the armature. The operative positions on the shunt drum 16 are arranged in a reverse order from those hereinbefore described, that is to say, in the first operative position, the shunt circuit around the armature 4 is completed with the maximum amount of resistance included therein, while further movement of this drum through the remaining operative positions gradually reduces the amount of this resistance. The operation of this form of interlocking mechanism is as follows: When the main drum 15 is in its "off" position or in any one of its operative positions on the hoisting side corresponding to which the segmental recess 45 in the cam 44 is provided, the shunt drum 15 may be moved to any of its positions, notwithstanding the greater size of the cam 48 in a radial direction over a portion 47 of its circumference, as the increased radial depth of the segmental recess 45 on the cam 44 of the main drum 15 in such positions will permit of further movement to the left of the interlocking bolt 27 which is caused by reason of the engagement of the roller 28 with the portion 47 of the cam 48. It will be understood, therefore, that the operation of the controller 6 on its hoisting side, may be the same with the modified form of interlocking mechanism as with that first described herein. As soon as the main drum 15 has been moved to one of the operating positions on the lowering side, corresponding to which a segmental recess 46 is provided in the cam 44, the shunt drum 16 can be moved from its "off" position only in counter-clockwise direction, on account of the relatively shallow depth of the recess 46 and the increased radius of the cam portion 47. In this way, the resistance 10 in the shunt circuit around the armature 4 when the main drum 15 is in any of its lowering positions, cannot be reduced beyond a predetermined amount.

In a crane controller, such as has been described herein, certain of the lowering positions correspond to the braking positions on an ordinary controller in which the armature and field of the motor are short circuited through a variable amount of resistance, and it is well understood that, as the controller is moved through these positions, the resistance through which the armature and field are short-circuited, is gradually increased. It is important that, in these positions, it must not be possible to complete the shunt circuit around the armature except when there is not less than a predetermined amount of resistance in the braking circuit. This is provided for by laying out the segmental recess 45 in the cam plate 44 on the main drum 15 to extend only over those lowering positions in which the necessary amount of resistance is included in the braking circuit.

To obtain the desired variations in speed, the operation of the controller provided with the modified form of interlocking mechanism described above is as follows: On the hoisting side, the controller is operated in the same manner as that described with reference to the first mentioned form of interlocking mechanism, except that the shunt drum 16 is first rotated from its "off" position to the last of its operative positions before the main drum 15 is moved to its first or second notch, and to increase the speed of the motor it is subsequently rotated backward to the "off" position. On the lowering side, the first positions of the main drum 15 will provide the usual braking circuit with gradually increasing amounts of resistance. As soon as a position is reached in which the value of this resistance has been increased to the desired degree, the interlocking mechanism 11 will permit the shunt drum 16 to be operated to complete and vary the resistance 10 in the shunt circuit around the armature 4 of the motor to effect the desired speed changes. As already mentioned, the largest amount of resistance is included in the shunt circuit in the first operative position of the shunt drum 16, and in order to decrease the speed of the motor 3, the shunt drum 16 is moved to others of its positions in which the amount of resistance 10 is gradually decreased, thereby diverting more and more of the current flowing through the armature 4. Owing, however, to the fact that the interlocking mechanism 11 will not permit the shunt drum 16 to be rotated beyond a certain position on the lowering side, the resistance 10 in the shunt circuit around the armature 4 cannot be reduced below a predetermined amount.

While, for the purpose of enabling a clear understanding of the invention to be obtained, a specific form of interlocking mechanism has been described in connection with a particular form of controller, it is of course to be understood that my invention is not limited to the structural arrangements set forth, as many variations may be made therein without departing from the spirit and scope of my invention.

I claim as my invention:

1. An electric control system embodying a motor provided with a field magnet winding and an armature, independent resistances respectively adapted to be connected in series with the motor and in shunt to the armature, switching devices for manipulating said resistances, and means dependent upon the relative position of said devices for rendering certain of said devices temporarily inoperative.

2. An electric control system embodying a motor provided with a field magnet winding and an armature, independent resistances respectively adapted to be connected in series with the motor and in shunt to the armature, separate controller drums adapted to be employed in regulating said resistances for controlling the operation of the motor, and means adapted to allow the use of said shunt resistance only when a predetermined amount of said series resistance is included in the circuit.

3. In an electric control system, a motor provided with a field magnet winding and an armature, independent resistances respectively adapted to be connected in series with the motor and in shunt to the armature, a controller provided with a plurality of drums adapted to be employed in regulating said series and shunt resistances for controlling the operation of the motor, cams severally attached to said drums, and mechanical interlocking means adapted to engage said cams and prevent the operation of said shunt drum when the series drum is in certain predetermined positions.

4. The combination with a plurality of movable switch members having position-accentuating devices, of interlocking mechanism comprising cams on the respective movable switch members, an interposed stationary guide member, and a rod and resilient-actuating means therefor disposed entirely within said guide member, said rod being actuated by either cam to lock the other against movement when the switch member having the actuating cam is in certain predetermined positions.

5. In an electric controller, an inclosing case, a plurality of rotatable drums disposed therein and provided with coöperating stationary and movable contact members, mechanical position-accentuating devices for said drums comprising notched disks severally attached to the drum shafts and independently-mounted spring-actuated pawls maintained in engagement with said disks, cams severally affixed to the shafts of said drums and mechanical interlocking means disposed between said drums, said means comprising an independently-mounted casing, a rod provided with a roller at one end and adapted to move longitudinally within said casing, and a helical spring associated with said rod and disposed within said casing and adapted to maintain said rod in selective engagement with said cams for preventing the operation of each drum when the other is in certain predetermined positions.

6. The combination with a plurality of movable switch members having position-accentuating devices, of interlocking mechanism comprising cams on the respective movable switch members, an interposed tubular guide member, a longitudinally movable rod located in said guide member and projecting from its ends to engage said cams, and a helical spring surrounding said rod within said guide member and serving to hold one end of the rod yieldingly against the corresponding cam.

7. A mechanism for interlocking a plurality of controller drums embodying a plurality of cams severally affixed to said drums, a rod provided with a collar and a roller at one end, an independently-mounted casing provided with an internal shoulder and disposed between said drums for inclosing and guiding said rod, and a helical spring disposed around said rod and within said casing and interposed between said collar and said shoulder for maintaining said rod in selective engagement with said cams and preventing the operation of each drum when the other is in certain predetermined positions.

In testimony whereof, I have hereunto subscribed my name this nineteenth day of December 1912.

PERCY STUART TURNER.

Witnesses:
H. B. GREEN,
EUSTICE H. PARKER.

---

Copies of this patent may be obtained for five cents each, by addressing the "Commissioner of Patents, Washington, D. C."